United States Patent
Gowtham et al.

(10) Patent No.: US 12,532,316 B2
(45) Date of Patent: Jan. 20, 2026

(54) ACQUIRING SYSTEM INFORMATION BASED ON MULTIPLE BEAMS

(71) Applicant: Apple Inc., Cupertino, CA (US)

(72) Inventors: Siri Gowtham, San Diego, CA (US); Hongbo Yan, Vista, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 17/886,909

(22) Filed: Aug. 12, 2022

(65) Prior Publication Data

US 2023/0067375 A1    Mar. 2, 2023

Related U.S. Application Data

(60) Provisional application No. 63/240,149, filed on Sep. 2, 2021.

(51) Int. Cl.
*H04W 72/1273* (2023.01)
*H04B 7/08* (2006.01)
*H04W 72/044* (2023.01)
*H04W 72/0446* (2023.01)

(52) U.S. Cl.
CPC ........ *H04W 72/1273* (2013.01); *H04B 7/088* (2013.01); *H04W 72/0446* (2013.01); *H04W 72/046* (2013.01)

(58) Field of Classification Search
CPC ............. H04W 52/0238; H04W 48/08; H04W 72/1273; H04W 72/046; H04W 72/0046; H04B 7/0408; H04B 7/088
USPC ........................................................ 370/311
See application file for complete search history.

(56) References Cited

U.S. PATENT DOCUMENTS

| | | | |
|---|---|---|---|
| 10,884,855 | B1 | 1/2021 | Yazovitsky et al. |
| 2018/0249423 | A1* | 8/2018 | Garcia ................ H04B 17/373 |
| 2020/0389221 | A1 | 12/2020 | He et al. |
| 2020/0396744 | A1 | 12/2020 | Xiong et al. |
| 2021/0058135 | A1* | 2/2021 | Jung ..................... H04W 72/53 |
| 2021/0410130 | A1* | 12/2021 | Rahman ............ H04B 7/06964 |
| 2022/0330211 | A1* | 10/2022 | Awad ................ H04W 74/0833 |
| 2023/0217412 | A1 | 7/2023 | Zhang et al. |
| 2023/0319747 | A1 | 10/2023 | Goyal et al. |

(Continued)

FOREIGN PATENT DOCUMENTS

| | | |
|---|---|---|
| CN | 111294851 A | 6/2020 |
| CN | 111294923 A | 6/2020 |
| CN | 111819802 A | 10/2020 |

(Continued)

OTHER PUBLICATIONS

European Patent Application No. 22191364.3, Extended European Search Report, Jan. 4, 2023, 9 pages.

(Continued)

*Primary Examiner* — Kevin C. Harper
(74) *Attorney, Agent, or Firm* — Kilpatrick Townsend & Stockton LLP

(57) ABSTRACT

The present application relates to acquiring system information. In an example, a network can transmit instances of a same system information on multiple SSB beams. A UE can select a set of the SSB beams for system information acquisition. Soft decoding information, such as LLR, from the decoding of the instances received on the selected SSB beams is combined to decode and acquire the system information.

20 Claims, 13 Drawing Sheets

(56) References Cited

U.S. PATENT DOCUMENTS

2023/0397167 A1   12/2023   Murray et al.

FOREIGN PATENT DOCUMENTS

| EP | 3240340 | A1 | 11/2017 |
| EP | 3490184 | A1 | 5/2019 |
| EP | 3758252 | A1 | 12/2020 |
| WO | 2019061910 | A1 | 4/2019 |

OTHER PUBLICATIONS

On TRS/CSI-RS Occasion(s) for idle/inactive UEs, Sony, R1-2008369, 3GPP TSG RAN WG1 #1 03-e, 2020, 7 pages.
Power Consumption by UE in RRC Idle/Inactive, Samsung, R2-2006775, 3GPP TSG-RAN2 Meeting #111 Electronic, Aug. 2020, 4 pages.
European Patent Application No. 22172260.6, Extended European Search Report, Mailed on Oct. 18, 2022, 10 pages.
"Paging Enhancement for UE Power Saving", 3rd Generation Partnership Project Technical Specification Group-Radio Access Network Working Group1 Meeting #105, R1-2105770, May 10-27, 2021, 5 pages 9 .
U.S. Appl. No. 17/852,010 , Non-Final Office Action, Mailed On May 29, 2025, 20 pages.
Chinese Patent Application No. 202210611770.4 , Office Action, Mailed On Jun. 19, 2025, 10 pages.
Chinese Patent Application No. 202211023296.X , Office Action, Mailed On Jun. 14, 2025, 27 pages.
European Patent Application No. 22172260.6 , Office Action, Mailed On Jul. 31, 2025, 5 pages.

\* cited by examiner

800

Receiving, from a network during a system information (SI) window, a plurality of SI instances of system information, wherein the SI window is a time duration during which the network transmits the plurality of SI instances, and wherein at least one SI instance is transmitted per beam of a plurality of beams 802

Decoding a first SI instance of the plurality of SI instances, the first SI instance received over a first beam of the plurality of beams 804

Decoding a second SI instance of the plurality of SI instances, the second SI instance received over a second beam of the plurality of beams 806

Acquiring the system information based on the decoding of the first SI instance and the decoding of the second SI instance 808

FIG. 8

ACQUIRING SYSTEM INFORMATION BASED ON MULTIPLE BEAMS

CROSS-REFERENCE TO RELATED APPLICATION

This application claims the benefit of U.S. Provisional Patent Application No. 63/240,149, filed on Sep. 2, 2021, which is herein incorporated by reference in its entirety for all purposes.

BACKGROUND

Fifth generation mobile network (5G) is a wireless standard that aims to improve upon data transmission speed, reliability, availability, and more. This standard, while still developing, includes numerous details relating to cell selection/reselection, where, for instance, a user equipment (UE) can communicate with a network to send and receive data. The UE can operate in a discontinuous reception (DRX) mode to reduce its power consumption, whereby the UE can deactivate some of its transmission and/or reception components for a certain period of time during which no data communication occurs.

BRIEF DESCRIPTION OF THE DRAWINGS

FIG. 8 illustrates an example of an operational flow/ algorithmic structure for acquiring SI based on multiple SSB beams, in accordance with some embodiments.

DETAILED DESCRIPTION

Figure 1:
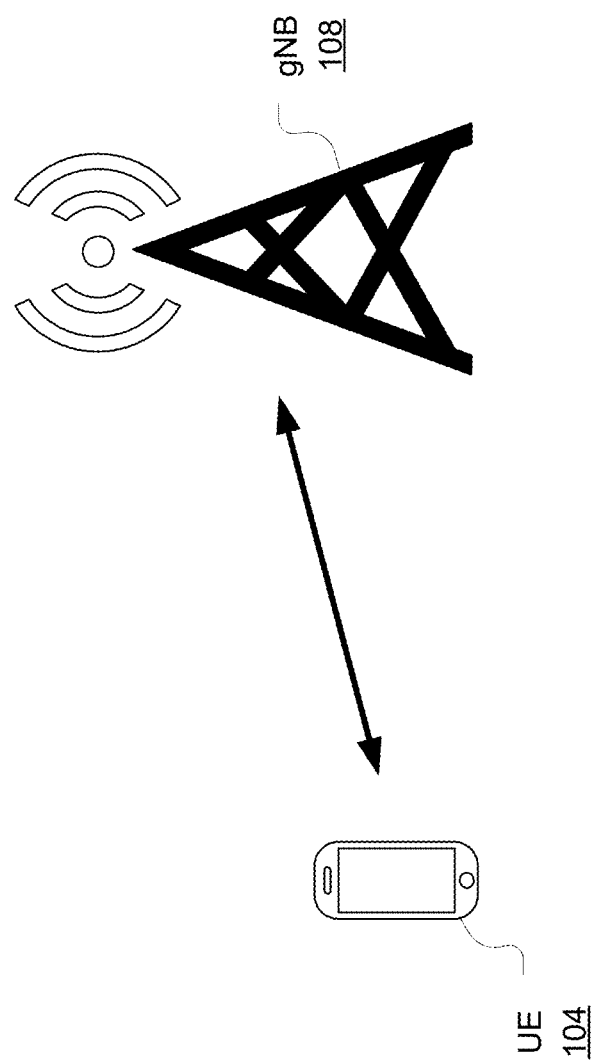
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as with one or more base stations or other network nodes. To improve the UE's power consumption, the UE can operate in an idle mode. Nonetheless, during the idle mode, the network may need to communication information to the UE. Accordingly, the network can, in a monitoring occasion (MO) indicate, to the UE system, the scheduling of information (SI) (e.g., periodic system information block (SIB)) that, in turn, carries a particular message to the UE and/or indicates to the UE a procedure to perform. During a DRX cycle, the UE may wake up to acquire the SI based on the scheduling and, depending on the success or failure of the acquisition, go back to deep sleep or light sleep. Because the UE wakes up to acquire the SI and may not go back to deep sleep, the SI acquisition can consume power.

Further, during an SI acquisition window, the network may send multiple instances of the SI (e.g., copies of the same system information) on multiple beams, referred to herein as synchronization signal block (SSB) beams. Each SSB beams carries at least one SI instance. For periodic SI (e.g., SIB 2 through SIB 9), each SSB beam may carry multiple SI instances.

To improve the power consumption and speed up the SI acquisition, the UE may select a set of the SSB beams based on measurement metrics. For example, this set includes the SSB beams that have signal to noise ratio (SNR) measurements and/or reference signal received power (RSRP) measurements that exceed one or more measurement metric thresholds. The UE can acquire the SI information by performing a soft decoding on each SSB beams of the set, where soft information, such as log likelihood ratio (LLR) information of the different soft decoding procedures can be combined.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities that is a network node of a communications network (or, more briefly, network) and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects, or services accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements at a common communication protocol layer have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in an SSB. The SSBs may be used by the UE 104 during a cell search procedure (including cell selection and reselection) and for beam selection.

The PDSCH may be used to transfer end-user application data, signaling radio bearer (SRB) messages, system information messages (other than, for example, MIB), and SIs.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction and PUSCH and PUCCH in the uplink direction.

In an example, communications with the gNB 108 and/or the base station can use channels in the frequency range 1 (FR1), frequency range 2 (FR2), and/or a higher frequency range (FRH). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

To improve the UE's 104 power consumption, the UE 104 can operate in an idle mode. In support of the idle mode, the UE 104 may perform multiple mechanism. One mechanism relates to SI acquisition. In particular, the UE 104 stays, during the idle mode, in a sleeping mode (e.g., a sleep state or de-active state) of a DRX cycle and periodically wakes up (e.g., a wake state or an active state) to acquire SI.

Figure 2:
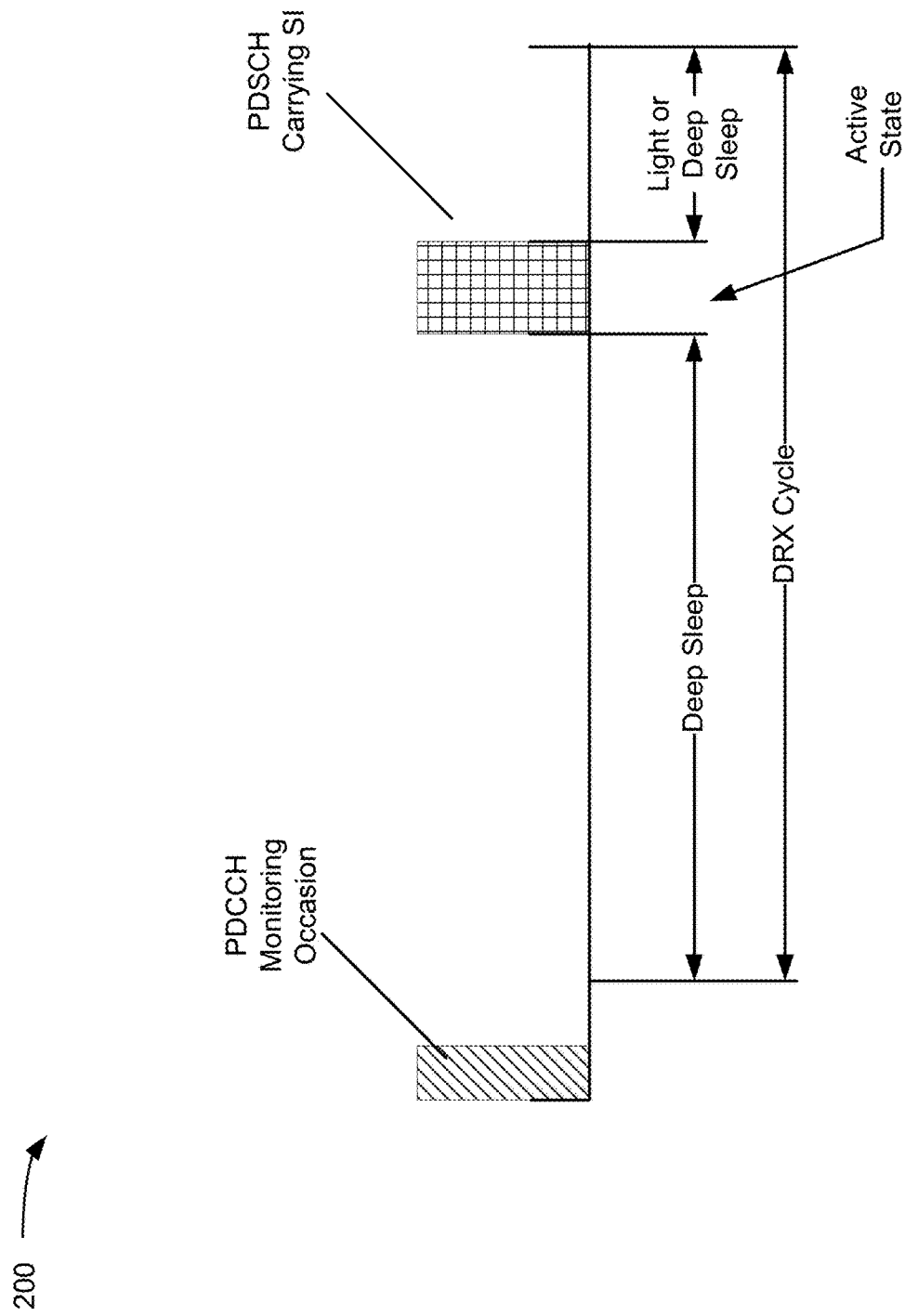
FIG. 2 illustrates an example of diagram of a DRX cycle and related system information (SI) reception, in accordance with some embodiments.

FIG. 2 illustrates an example of diagram 200 of a DRX cycle and related SI reception, in accordance with some embodiments. This figure illustrates how a UE (e.g., the UE 104 of FIG. 1) can receive SI on a single SSB beam. Nonetheless, and as further described in the next figures, instances of the SI can be received on multiple SSB beams, and the SI can be acquired based on decoding that uses a set of SSB beams from the multiple SSB beams. Further, the SI can be periodically transmitted on the same SSB beam.

In the illustration of FIG. 2, the UE may be operating in an idle mode where no data is being communicated with the network. The UE can deactivate (e.g., turn off or enter a power save mode) some or all of its RF components (e.g., transmission components and/or reception components) during a DRX cycle to reduce its power consumption. Nonetheless, the UE can wake up to receive an SI transmitted from the network. As such, the DRX cycle can be divided into multiple sub-cycles: a deep sleep cycle, an active state cycle, and a light sleep cycle. The deep sleep cycle is associated with the least power consumption, whereas the active state cycle is associated with the highest power consumption of the UE during the DRX cycle. In particular, during the deep sleep cycle, the RF components are deactivated and the UE does not receive or transmit to the network. During the active state cycle, the UE is woken up (e.g., its RF components are activated) to enable reception and/or transmission. The light sleep cycle can follow the active state cycle, whereby some but not all of the RF components are deactivated (e.g., in this way, if the UE needs to re-enter the active state cycle, the switch from the light sleep cycle to the active state cycle is relatively faster than the equivalent switch from the deep sleep cycle; for instance, RF tuning can be faster given the smaller subset of RF components that are deactivated in the light sleep cycle).

In an example, during the active state cycle, the UE is in an active state that enables it to receive a reference signal, such as SI as illustrated in FIG. 2. The UE wakes up to receive the SI. The SI (or, more precisely SI instances of the SI) can be periodically transmitted by the network. This can be the case with SIB 2, SIB 3, SIB 4, SIB 5, SIB 6, SIB 7, SIB 8, and SIB 9. Prior to waking up, the UE can be in deep sleep. Depending on whether the SI acquisition is successful or not and on the SI periodicity, the UE can go back to deep sleep (e.g., upon a successful acquisition and/or no additionally scheduled SI instance) or can transition to light sleep (e.g., upon an acquisition failure and additionally scheduled SI instance(s)).

As also illustrated in FIG. 2, a monitoring occasion can be transmitted by the network to the UE. Generally, the monitoring occasion can be a PDCCH monitoring occasion, whereby the UE can perform blind decoding in a search space of the PDCCH of the SSB beam to determine the monitoring occasion. This monitoring occasion can include DCI that is carried (e.g., encoded) in resources of the PDCCH on the SSB beam and that schedules the SI in a PDSCH on the SSB beam. Also generally, resources of the PDSCH (e.g., the scheduled resource elements) can carry the information of the SI. If the SI is scheduled (e.g., as indicated by the DCI), the UE can decode the SI from the resources of the PDSCH.

In the particular illustration of FIG. 2, a PDCCH monitoring occasion is sent before the UE goes into the deep sleep cycle. The UE decodes the monitoring occasion and determines that SI is scheduled on the PDSCH (starting at a first symbol within a slot and ending at a second symbol within the slot). The UE goes into the deep sleep cycle till the first slot, where the UE enters the active state to then attempt acquiring the SI.

Figure 3:
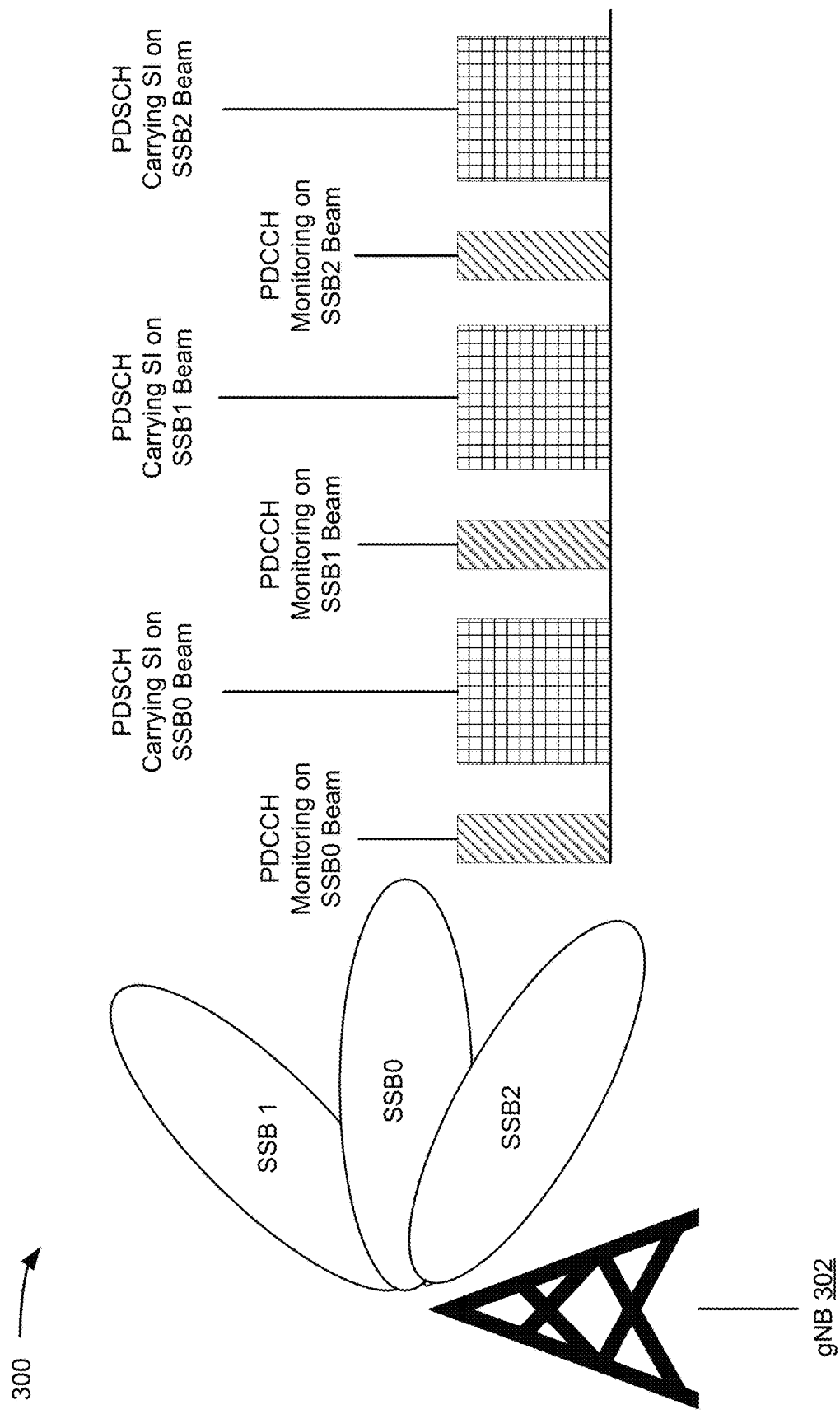
FIG. 3 illustrates an example of a diagram for transmitting monitoring occasions and SI on synchronization signal block (SSB) beams, in accordance with some embodiments.

FIG. 3 illustrates an example of a diagram 300 for transmitting monitoring occasions and SI on SSB beams, in accordance with some embodiments. As illustrated, a network node 302 (e.g., the gNB 108 of FIG. 1) can transmit MOs and SI instances of the same SI to a UE (e.g., the UE 104 of FIG. 1) using multiple SSB beams.

The beams used for the transmission of SI are referred to herein as SSB beams (e.g., an analog beam dedicated to a specific SSB).

In the illustration of FIG. 3, the network node 302 performs beam sweeping to SSB beams are indexed with SSB beam indexes "i" (shown in FIG. 2 as "i" equal to "0," "1," and "2"). An SSB caries the PSS, the SSS, and the PBCH and is repeated in the SSB beams in a burst, and this SS burst is repeated periodically. A cell can be covered by up to four SSB beams for a sub-3 GHz carrier and up to eight SSB beams for a carrier with a three to six GHz range.

The network node 302 transmits the same SI over all deployed beams within a cell to ensure (e.g., increase or maximize the likelihood) that the UE receives the SI no matter where the UE is within the cell. For example, a monitoring occasion for an SI instance of the SI is sent in resource elements of a PDCCH search space on each SSB beam (e.g., these resource elements encode the MO but not eh SI instance). The SI is also sent in resource elements of a PDSCH on each SSB beam. Further, the SI can be sent periodically on each SSB beam, whereby the SI instances are repeatedly sent in PDSCH resource elements of the SSB beam depending on the SI periodicity. The UE performs beam sweeping to select one or more SSB beams (e.g., an SSB beam(s) that has (have) the highest performance metrics among the SSB beams, where the performance metrics are determined based on SSB measurements) for, among other purposes, determining which PDSCH resource elements to use in order to acquire the SI.

In the illustration of FIG. 3, three SSB beams are illustrated. The monitoring occasion and the SI are each transmitted at least three times, once on each of the three SSB beams. The monitoring occasion and SI on SSB0 beam are illustrated in FIG. 3 as PDCCH monitoring on SSB0 beam and PDSCH carrying SI on SSB0 beam, respectively. Similarly, the monitoring occasion and SI on SSB1 beam are illustrated in FIG. 3 as PDCCH monitoring on SSB1 beam and PDSCH carrying SI on SSB1 beam, respectively. Additionally, the monitoring occasion and SI on SSB2 beam are illustrated in FIG. 3 as PDCCH monitoring on SSB2 beam and PDSCH carrying SI on SSB2 beam, respectively.

The diagram 300 illustrates an example where the monitoring occasion and SI on SSB0 beam are received by the UE first, followed by the reception of the monitoring occasion and SI on SSB1 beam, and then by the reception of the monitoring occasion and SI on SSB2 beam. However, variations to the diagram 300 are possible and can depend on, for instance, the RF environment and/or location of the UE within the cell. Generally, the monitoring occasion on an SSB beam precedes the SI on that same SSB beam. However, the monitoring occasion on a first SSB beam can precede or follow a monitoring occasion or an SI on a second SSB beam. Additionally or alternatively, the SI on the first SSB beam can precede or follow the monitoring occasion or the SI on the second SSB beam.

Figure 4:
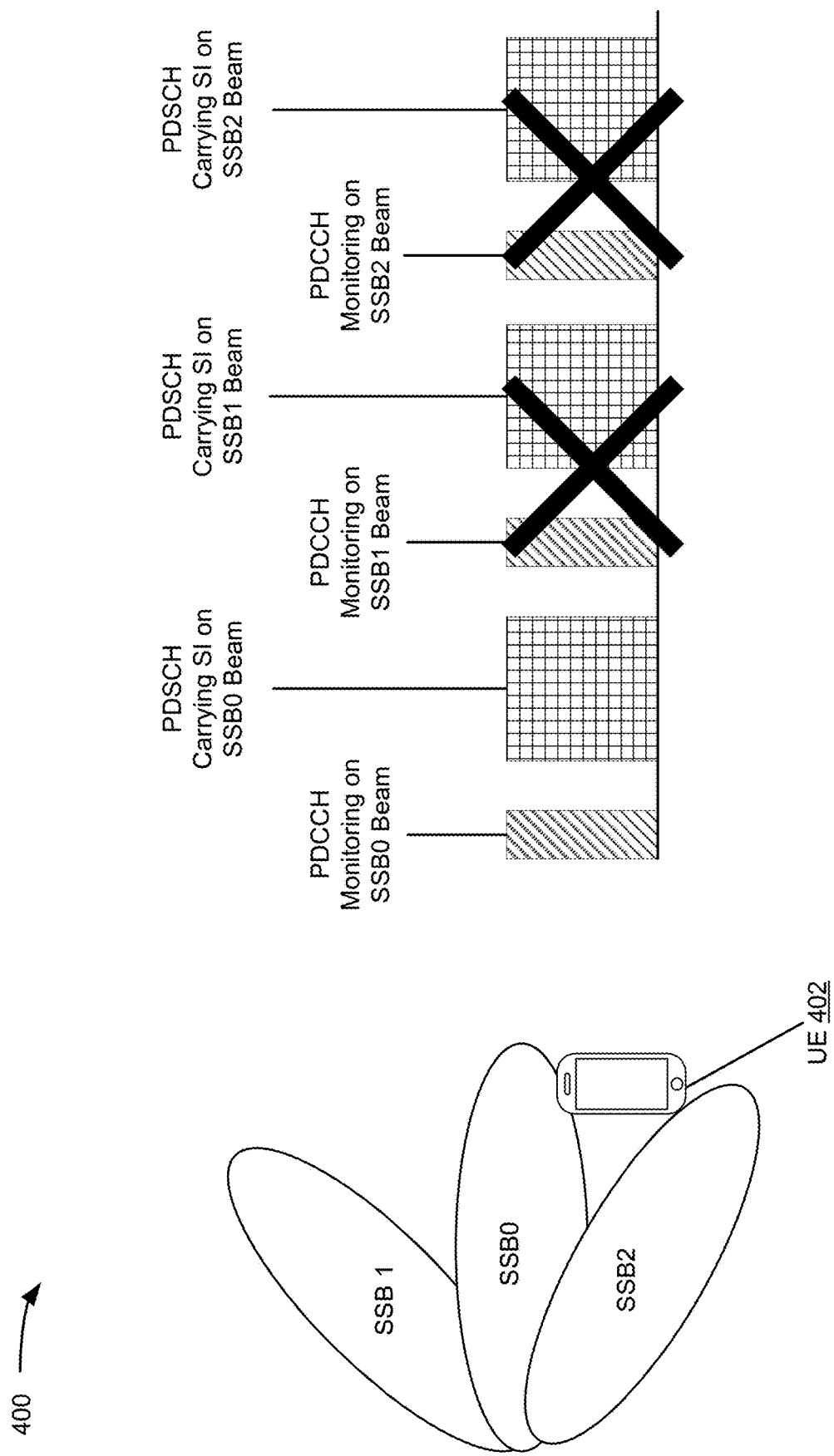
FIG. 4 illustrates an example of a diagram for receiving monitoring occasions and SI on a single SSB beam, in accordance with some embodiments.

FIG. 4 illustrates an example of a diagram 400 for receiving monitoring occasions and SI on a single SSB beam, in accordance with some embodiments. Here, and like the description of FIG. 3, a UE 402 (e.g., the UE 104 of FIG. 1) can receive monitoring occasions and SIs transmitted from a network node (e.g., the gNB 108 of FIG. 1) on multiple SSB beams. However, the UE 402 may have selected, for SI acquisition, to use only an SI instance(s) sent on one SSB beam (SSB 0 beam in the illustration of FIG. 3).

To select an SSB beam, the UE 402 performs measurements on SSBs received in the SSB beams and determine measurement metrics of the SSB beams (e.g., SNR measurements and/or RSRP measurements). The SSB beam may be selected for the SI acquisition based on having the best measurement metric among the SSB beams (e.g., the best SNR measurement and/or the best RSRP measurement). The SSB reception, measurements, and the SSB beam determinations can be repeated periodically in support of beam selection/reselection.

As explained herein above, the UE 402 may receive a monitoring occasion and an SI on each SSB beam. Similarly to FIG. 3, the monitoring occasion and SI on each SSB beam are here illustrated as PDCCH monitoring on SSB0 beam and PDSCH carrying SI on SSB0 beam, PDCCH monitoring on SSB1 beam and PDSCH carrying SI on SSB1 beam, and PDCCH monitoring on SSB2 beam and PDSCH carrying SI on SSB2 beam.

Because the UE 402 has selected SSB0 beam, the UE 402 may monitor the monitoring occasion on the SSB0 beam (e.g., by performing blind decoding in the search space of the PDCCH on the SSB0 beam) to determine whether an SI is scheduled for the UE 402. If so, the UE 402 may decode the SI on the SSB0 beam (e.g., by decoding the resources of the PDSCH on the SSB0, where these resources carry the SI information). Because of the SSB0 beam selection, the UE 402 may not monitor the monitoring occasion and/or decode the SI on the SSB1 beam or the SSB2 beam, as illustrated with the two "X" marks on the diagram 400.

Figure 5:
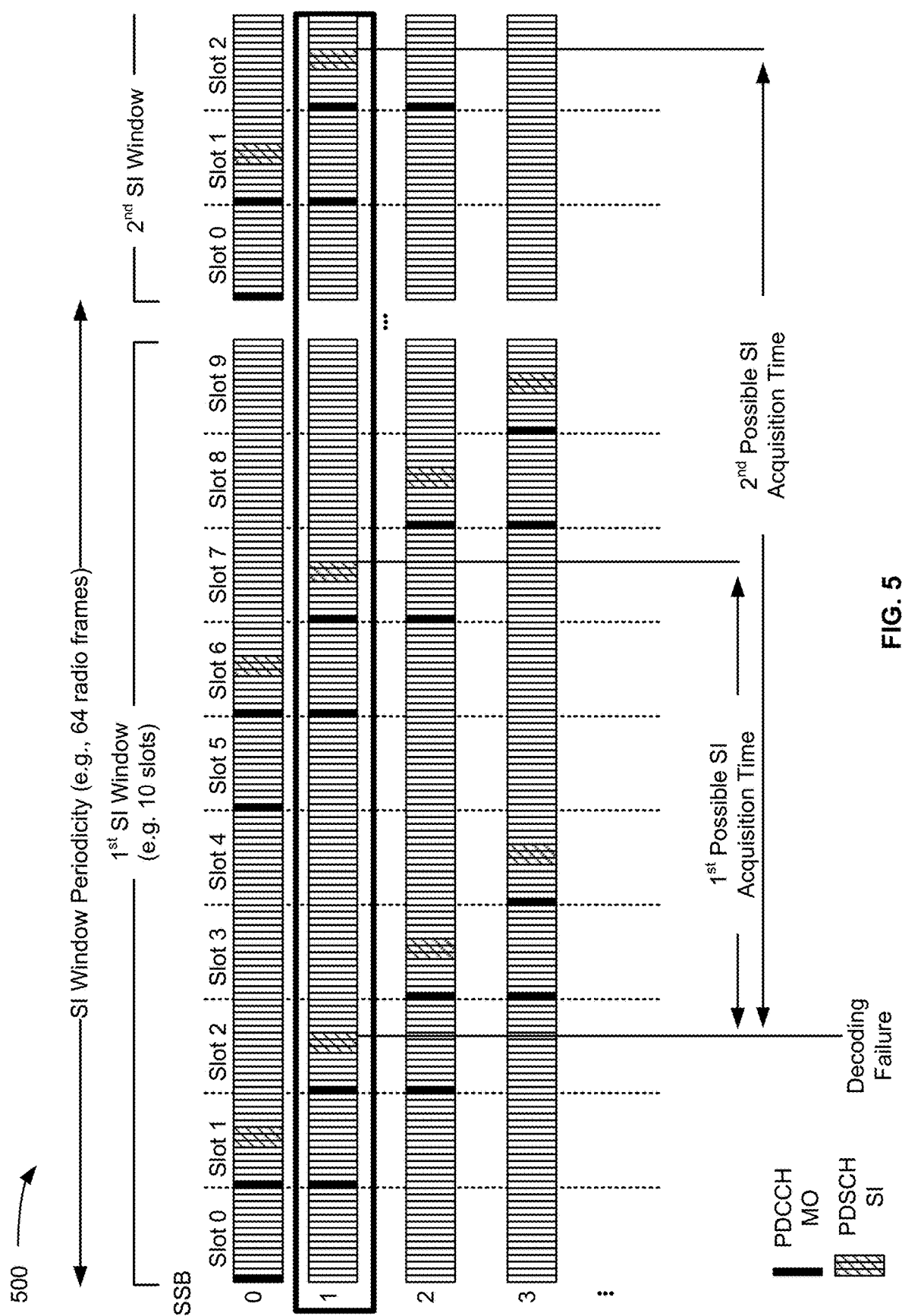
FIG. 5 illustrates an example of SI acquisition based on a single SSB beam, in accordance with some embodiments.

FIG. 5 illustrates an example of SI acquisition 500 based on a single SSB beam, in accordance with some embodiments. The SI acquisition 500 is an example of implementing the diagram 400 of FIG. 4, whereby only one SSB beam is selected for the SI acquisition 500. For illustrative purposes, four SSB beams are shown, although a different number of SSB beams is possible.

In the time domain, an SI window can be used to transmit SI. For illustrative purposes, the SI window is shown to have a duration of ten slots, although a different duration is possible. Generally, the SI window includes the duration within which a network transmits the same SI (e.g., SI instances thereof) over multiple SSB beams and at least once per SBB beam for complete coverage of a cell. Further, a particular SI window periodicity can be configured by a higher layer parameter. For illustrative purposes, the SI window periodicity is shown to be sixty-four radio frames, although a different value of the SI window periodicity is possible.

A PDCCH symbol that carries an MO occasion for SI is shown with a solid black rectangle. A set of PDSCH symbols (illustrated as three symbols, although a different number is possible) that carry SI is illustrated with a diagonally dashed rectangle. A particular pattern of PDCCH MO and PDSCH SI is illustrated, although also a different pattern is possible.

As illustrated, the MOs at slot "0" and slot "1" associated with SSB index "0" provide the PDSCH scheduling information to acquire SI using the SSB 0 beam. Given an MO periodicity of five slots (although a different value of the MO periodicity is possible), the MOs at slot "5" and slot "6" associated with SSB index "0" provide the PDSCH scheduling information for another or continued SI acquisition using SSB 0 beam. Similar MOs at different slots provide the PDSCH scheduling information on the other SSB beams.

As illustrated with the rectangle around the slots of SSB index "1," the UE selects SSB 1 beam for the SI acquisition 500. This selection can be based on, for example, SSB 1 beam having the highest SNR. The MOs at slot "1" and slot "2" associated with SSB index "1" provide the PDSCH scheduling information to acquire SI using the SSB 1 beam. Given the MO periodicity of five slots, the MOs at slot "6" and slot "7" associated with SSB index "1" provide the PDSCH scheduling information for another or continued SI acquisition using SSB 1 beam. If SI is not acquired during the SI window, the SI can be acquired in the next SI window. The start of the two SI windows are spaced apart by the SI window periodicity (e.g., sixty-four radio frames).

Accordingly, the UE is in an active state to decode the PDSCH symbols received in slot "2" associated with SSB index "1." If this decoding is successful, the SI acquisition 500 is complete, and the UE can go to deep sleep for the remainder of the SI window. However, if this decoding is not successful, the UE goes into light sleep. In this case, the UE is in an active state to decode the PDSCH symbols received in slot "7" associated with SSB index "1." Here also, if the decoding is successful, the SI acquisition 500 is complete, and the UE can go to deep sleep for the remainder of the SI window. However, if this decoding is not successful, the UE goes into light sleep. Of course, the use of multiple active state cycles and light sleep cycles is possible depending on the SI periodicity and the duration of the SI window. Assuming that the decoding is not successful during the SI window, the SI acquisition 500 cannot be completed until at least the first successful PDSCH decoding in the next SI window (illustrated as being at slot "2" associated with SSB index "1" in the second SI window).

Generally, the PDSCH decoding uses a soft decoding procedure (e.g., a low density parity check decoding procedure) that decodes the SI instance based on LLR information. When repeated on the same SSB beam, the LLR information from the previous PDSCH decoding can be combined with the LLR information of the current PDSCH decoding. For example, when currently decoding the PDSCH slots in slot "7," the LLR information from the decoding of the PDSCH slots in slot "2" is combined with the LLR information of the current decoding.

Per this example, if the first PDSCH decoding fails, the first possible SI acquisition time is the duration between slot "2" and slot "7" (e.g., five slots, or equivalently, the SI periodicity). If the second PDSCH decoding fails, the second possible SI acquisition time is the duration between the two slots "2" (e.g., sixty-four radio frames, or equivalently, the SI window periodicity).

In another illustration, assume that one SI instance is scheduled and sent per SSB beam within an SI window. In this illustration, also assume that SSB 1 beam has the highest SNR and that the PDSCH SI is in slot "2." As such, during the first SI window, the UE attempts to decode the first SI instance on SSB 1 beam. If this decoding is successful, the SI acquisition 500 is complete. However, if this decoding is not successful, the next SI instance on SSB 1 beam is not available for decoding until the next SI window. As such, the shortest possible time to complete the SI acquisition 500 is about sixty-four radio frames.

Figure 6:
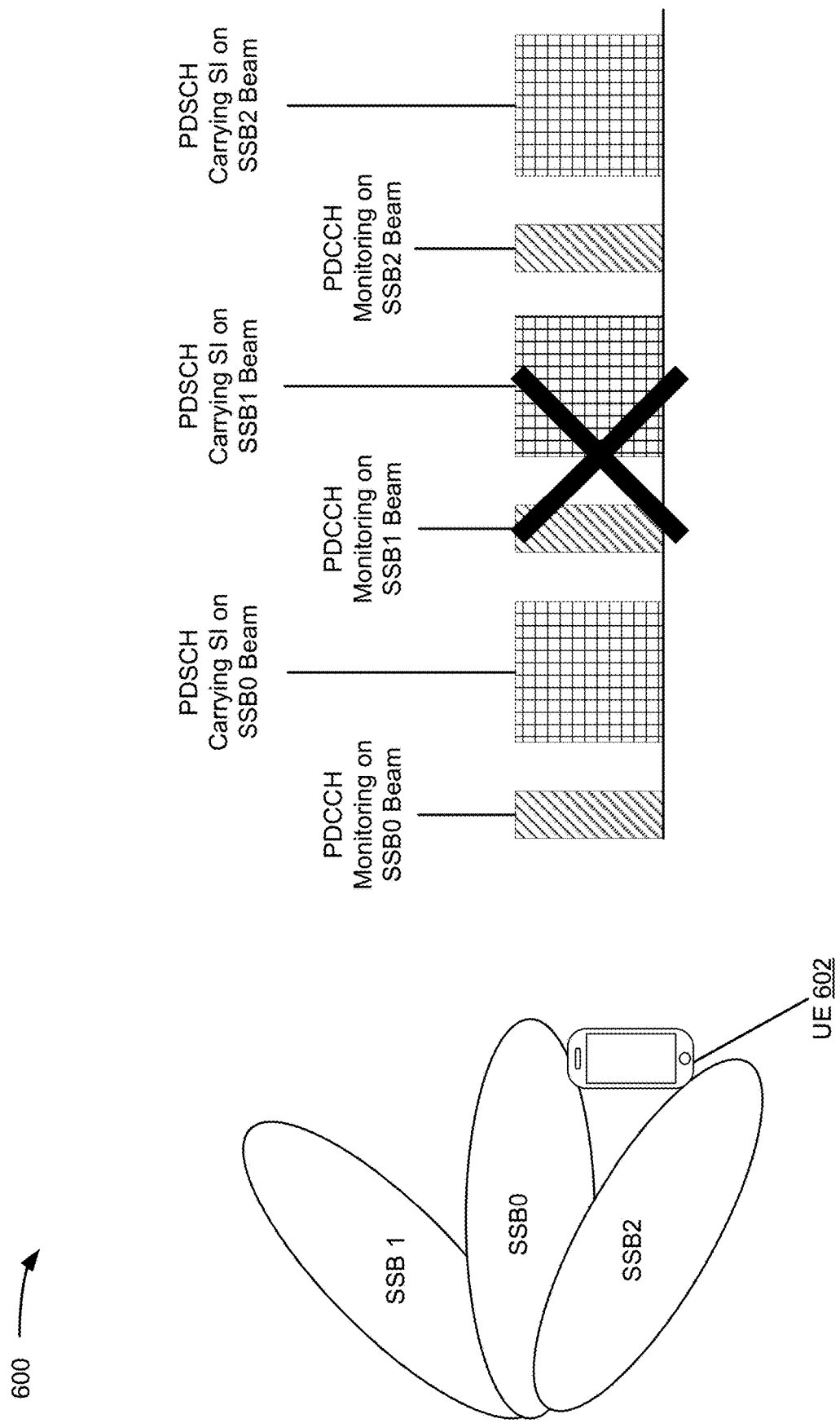
FIG. 6 illustrates an example of a diagram for receiving monitoring occasions and SI on multiple SSB beams, in accordance with some embodiments.

FIG. 6 illustrates an example of a diagram 600 for receiving monitoring occasions and SI on multiple SSB beams, in accordance with some embodiments. As illustrated, a UE 602 (e.g., the UE 104 of FIG. 1) can receive monitoring occasions and SI (e.g., SI instances of the same SI) transmitted from a network node (e.g., the gNB 108 of FIG. 1) on multiple SSB beams. Here, and unlike the description of FIG. 4, the UE 602 selects more than one SSB beam of the multiple SSB beams and acquire the SI by monitoring the MOs and decoding the SI instances received on the selected SSB beams.

To select SSB beams, the UE 602 performs measurements on SSBs received in the SSB beams and determines measurement metrics of the SSB beams (e.g., SNR measurements and/or RSRP measurements). An SSB beam may be selected for the SI acquisition based on a comparison of the measurement metrics associated there with to a measurement metric threshold. For example, if the SNR measurement exceeds an SNR threshold and/or the RSRP measurement exceeds an RSRP threshold, the SSB beam is added to a set of selected SSB beams. Adding or including an SSB beam to the set refers to identifying the SSB beam in the set, such as by listing the index of the SSB beam in the set.

As explained herein above, the UE 602 may receive a monitoring occasion and an SI on each SSB beam. Similarly to FIG. 4, the monitoring occasion and SI on each SSB beam are here illustrated as PDCCH monitoring on SSB0 beam and PDSCH carrying SI on SSB0 beam, PDCCH monitoring on SSB1 beam and PDSCH carrying SI on SSB1 beam, and PDCCH monitoring on SSB2 beam and PDSCH carrying SI on SSB2 beam.

Because multiple SSB beams are selected for the SI acquisition, the UE 602 may monitor the monitoring occasions on each selected SSB beam. If the MOs contain the SI-RNTI, then the PDSCH SI is available for decoding. In other words, if the RNTI is present in the PDCCH, the UE expects a PDSCH. If so, the UE 602 may decode the SI on the selected SSB beam (e.g., by decoding the resources of the PDSCH on the SSB0, where these resources carry the SI information). The decoding, if unsuccessful, on a selected SSB beam can be combined with the decoding on another SSB beam, such that the SI is acquired based on the SI instances received on the selected beams. This type of joint decoding is further illustrated in FIG. 7. Generally, the joint decoding combines LLR information from a current PDSCH reception and from previous PDSCH receptions for PDCSH decoding to improve the possible of a decoding success (e.g., a cyclic redundancy check (CRC) pass). This decoding success can also be achieved in a shorter amount of time relative to the single SSB beam decoding illustrated in FIGS. 4 and 5.

Referring to the particular illustration of FIG. 6, the UE 602 selects SSB0 beam and SSB 2 beam, whereas SSB 1 beam is not selected. This can be because the first two SSB beams have the highest SNRs, whereas SSB 1 beam has an SNR that is lower than the SNR threshold. such situation may arise when, for example, the UE 602 is located between the coverage of the SSB0 beam and the SSB2 beam, whereby the SSB1 beam is a much weaker beam than these two SSB beams. In this case, the weaker SSB beams or undetected SSB beams (e.g., the SSB1 beam) can be eliminated from the PDCCH monitoring and/or the PDSCH decoding over the multiple SSB beams. As illustrated with the "X" mark in the diagram 600, the PDCCH monitoring and/or the PDSCH decoding are performed on the SSB0 beam and the SSB2 beam but not the SSB1 beam.

Figure 7:
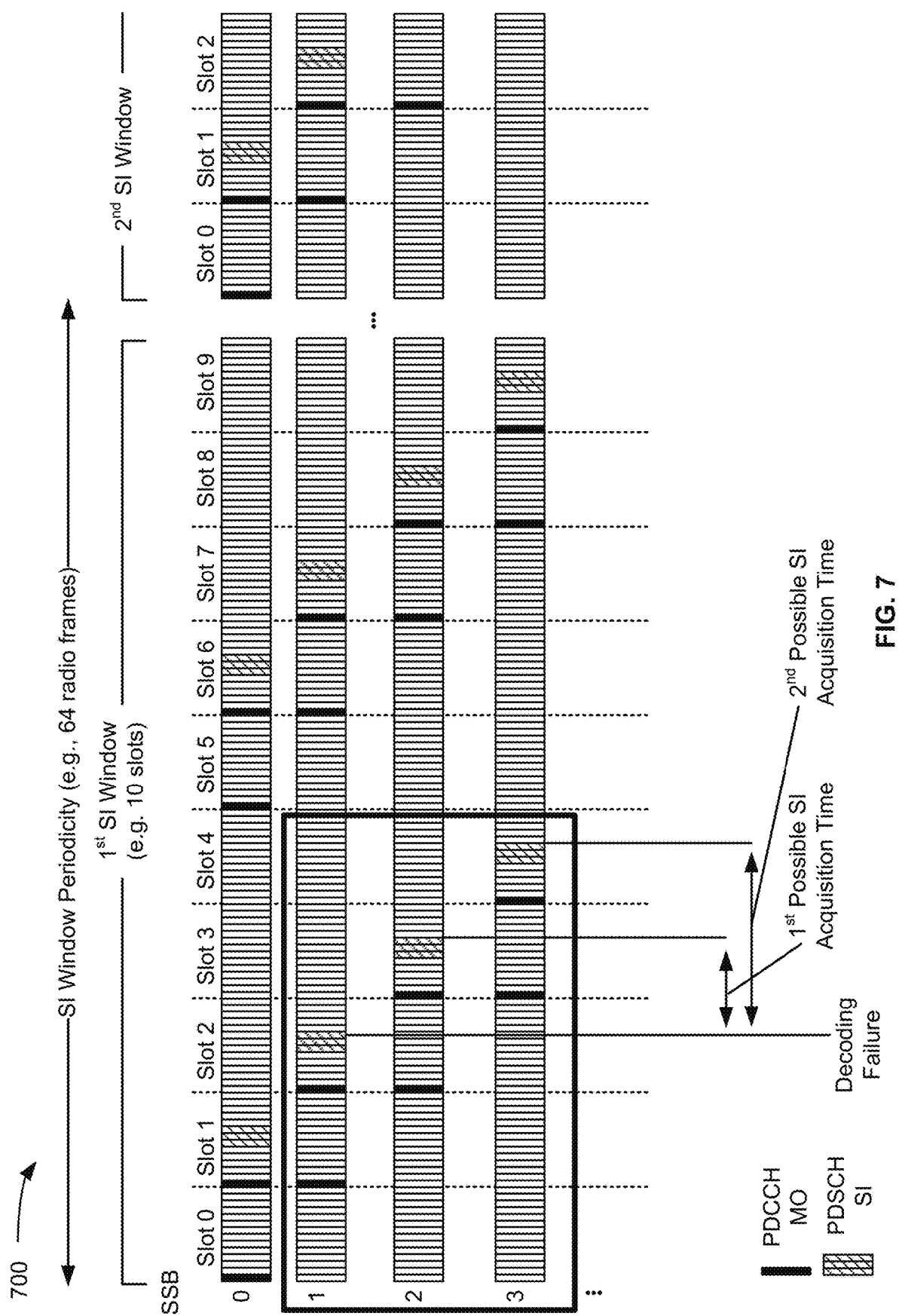
FIG. 7 illustrates an example of SI acquisition based on multiple SSB beams, in accordance with some embodiments.

FIG. 7 illustrates an example of SI acquisition 700 based on multiple SSB beams, in accordance with some embodiments. The illustrative example is similar to the one described in FIG. 5. Similarities are not repeated herein. Unlike the SI acquisition 500 that involves a single SSB beam, the SI acquisition 700 involves a UE decoding PDSCH on multiple selected SSB beams.

As illustrated with the rectangle around the slots of SSB index "1," SSB index "2," and SSB index "3," the UE selects SSB 1 beam, SSB 2 beam, and SSB 3 beam for the SI acquisition 700. This selection can be based on, for example, these three SSB beams each having an SNR that exceeds an SNR threshold. The MOs at slot "1" and slot "2" associated with SSB index "1" provide the PDSCH scheduling information to acquire SI using the SSB 1 beam. Similarly, the MOs at slot "2" and slot "3" associated with SSB index "2" provide the PDSCH scheduling information to acquire SI using the SSB 2 beam. Likewise, the MOs at slot "3" and slot "4" associated with SSB index "3" provide the PDSCH scheduling information to acquire SI using the SSB 3 beam.

Accordingly, the UE is in an active state to decode the first PDSCH symbols received in slot "2" associated with SSB index "1." If this decoding is successful, the SI acquisition 700 is complete, and the UE can go to deep sleep for the remainder of the SI window during which the SI is transmitted. However, if this decoding is not successful, the UE goes into light sleep. Unlike the acquisition 500 (where the UE waits until the next MOs and PDSCH symbols on SSB 1 beam), the UE is in an active state to decode the PDSCH symbols received in slot "3" associated with SSB index "2." Here also, if the decoding is successful, the SI acquisition 700 is complete, and the UE can go to deep sleep for the remainder of the SI window. However, if this decoding is not successful, the UE goes into light sleep. Next, the UE attempts to decode the PDSCH symbols received in slot "4" associated with SSB index "3." At this point, if the decoding remains unsuccessful, the UE reverts back to the SSB 1 beam and attempts to decode the PDSCH symbols in slot "7" associated with SSB "index "1." Of course, the use of multiple active state cycles and light sleep cycles is possible depending on the SI periodicity, the duration of the SI window, and the decoding failures. Assuming that the decoding is not successful during the SI window, the SI acquisition 700 cannot be completed until at least the first successful PDSCH decoding in the next SI window (illustrated as being at slot "2" associated with SSB index "1" in the second SI window).

Here also, the PDSCH decoding uses a soft decoding procedure (e.g., a low density parity check decoding procedure) that decodes the SI instance based on LLR information. When repeated on multiple SSB beams, the LLR information from the PDSCH decoding on the previous SSB beam can be combined with the LLR information of the PDSCH decoding on the current SSB beam. For example, the second PDSCH decoding on slot "3" associated with SSB index "2" can combine the LLR information of the first PDSCH decoding on slot "2" associated with SSB index "2" and the LLR information of the current, second PDSCH decoding. When repeated on the same SSB beam, the LLR information from the previous PDSCH decoding can be combined with the LLR information of the current PDSCH decoding. For example, when currently decoding the PDSCH slots in slot "7" associated with the SSB index "1," the LLR information from the previous PDSCH decoding on SSB 1 beam, SSB 2 beam, and SSB 3 beam can be combined with the LLR information of the current PDSCH decoding.

Per this example, if the first PDSCH decoding fails, the first possible SI acquisition time is the duration between slot "2" and slot "3" (e.g., one slot, or equivalently, one fifth of s). If the second PDSCH decoding fails, the second possible SI acquisition time is the duration between slot "2" and slot "4" (e.g., two, or equivalently, the two fifth of the SI periodicity). Accordingly, the SI acquisition 700 is much faster than the SI acquisition 500. The faster acquisition 700 signifies that the UE can more likely go to deep sleep relatively earlier, which translates to power consumption saving.

In another illustration of the performance improvement, assume that one SI instance is scheduled and sent per SSB beam within an SI window. In this illustration, also assume that the UE selects SSB 1 beam, SSB 2 beam, and SSB 3 beam for the SI acquisition 700. As such, during the first SI window, the UE attempts to decode the first SI instance on SSB 1 beam. If this decoding is successful, the SI acquisition 700 is complete. However, if this decoding is not successful, the next SI instance on SSB 2 beam within that same SI window can be decoded. And if this decoding is still unsuccessful, the next SI instance on SSB 3 beam within that same SI window can be decoded. Hence, the likelihood of completing the SI acquisition 700 within a few slots of the SI window is high. In comparison, and referring to FIG. 5, the SI acquisition 500 can take about sixty-four radio frames FIG. 8 illustrates an example of an operational flow/algorithmic structure 800 for acquiring SI based on multiple SSB beams, in accordance with some embodiments. Generally, a UE can implement the operational flow/algorithmic structure 800. The UE 104 can be, for example, the UE 104, the UE 1200, or the operational flow/algorithmic structure 800 can even be implemented by components of the UE, such as by processors 1204.

The operation flow/algorithmic structure 800 may include, at 802, receiving, from a network during an SI window, a plurality of SI instances of system information, wherein the SI window is a time duration during which the network transmits the plurality of SI instances, and wherein at least one SI instance is transmitted per beam of a plurality of beams. For example, the UE can be communicating with the network (e.g., with a node of the network, such as a gNB) by using multiple SSB beams. The network may send to the UE SI instances of the same SI on the different beams based on SSB beam periodicity and SI periodicity, as illustrated in FIGS. 5 and 7. The UE can accordingly receive, on each SSB beam (if detected), MOs scheduling the SI instances on that SSB beam.

The operation flow/algorithmic structure 800 may include, at 804, decoding a first SI instance of the plurality of SI instances, the first SI instance received over a first beam of the plurality of beams. For example, the UE performs SSB measurements on the detected SSB beams and selects a set of these SSB beams. The selection can be based on measurement metrics, such as SNR measurements and/or RSRP measurements (e.g., the set includes the SSB beams having the best measurements and/or the RSRP measurements exceeding one or more measurement metric thresholds). The first beam can be a first SSB beam included in the set. The UE may perform PDDCH decoding on the first SSB beam to determine an MO that schedules the first SI instance on the first SSB beam. The UE performs PDSCH decoding to decode the first SI instance. The PDSCH decoding can involve a first soft decoding procedure that uses first LLR information.

The operation flow/algorithmic structure 800 may include, at 806, decoding a second SI instance of the plurality of SI instances, the second SI instance received over a second beam of the plurality of beam. For example, the second beam can be a second SSB beam included in the set. The UE may perform PDDCH decoding on the second SSB beam to determine an MO that schedules the second SI instance on the second SSB beam. The UE performs PDSCH decoding to decode the second SI instance. The PDSCH decoding can involve a second soft decoding procedure that uses second LLR information. In an example, the second LLR information is combined with the first LLR information and used in the second soft decoding procedure.

The operation flow/algorithmic structure 800 may include, at 808, acquiring the system information based on the decoding of the first SI instance and the decoding of the second SI instance. For example, if the second soft decoding procedure is successful, the system information is decoded and output by the second soft decoding procedure. However, if unsuccessful, additional soft decoding can be performed on additional SI instances received on SSB beams included in the set, whereby the LLR information from previous PDSCH decoding can be combined with the LLR information of a current PDSCH decoding.

Figure 9:
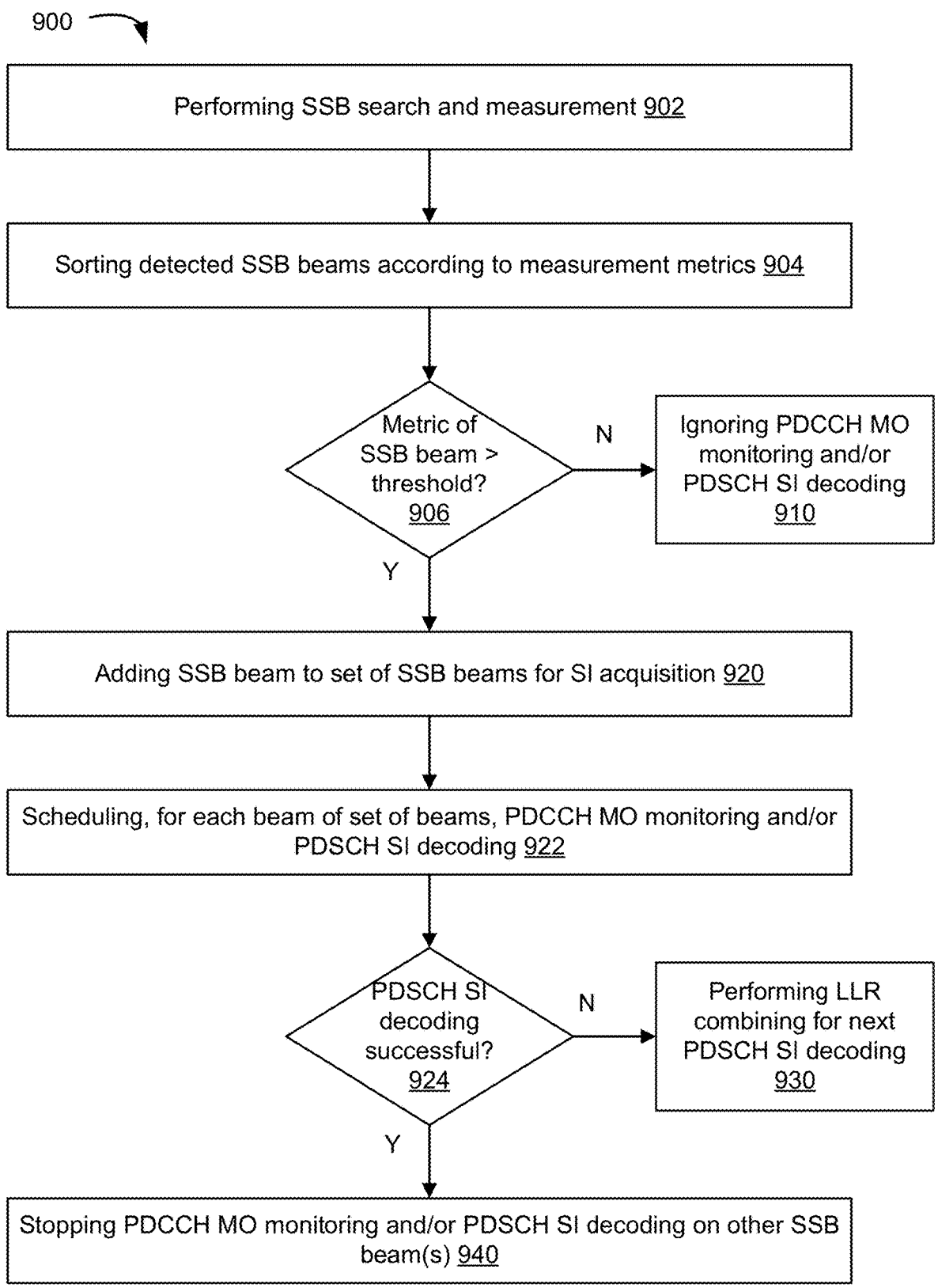
FIG. 9 illustrates another example of an operational flow/algorithmic structure for acquiring SI based on multiple SSB beams, in accordance with some embodiments.

FIG. 9 illustrates another example of an operational flow/algorithmic structure 900 for acquiring SI based on multiple SSB beams, in accordance with some embodiments. Operations of the operational flow/algorithmic structure 900 can be implemented as sub-operations of the operational flow/algorithmic structure 800.

The operation flow/algorithmic structure 900 may include, at 902, performing SSB search and measurement. For example, the network (e.g., the gNB) sends SSBs periodically on each SSB beam. The UE can receive an SSB on each SSB beam and perform an SSB measurement on each received SSB.

The operation flow/algorithmic structure 900 may include, at 904, sorting detected SSB beams according to measurement metrics. For example, a measurement metric can be defined for and associated with each detected SSB beam. The measurement metric of an SSB beam can include an SSB measurement, such as the SNR and/or RSRP, determined from the SSB transmitted on the SSB beam. The SSB beams can be sorted in a descending order depending on their respective SSB measurements.

The operation flow/algorithmic structure 900 may include, at 906, determining whether the measurement metric of an SSB beam is larger than a threshold. For example, the threshold includes an SSB measurement threshold (e.g., an SNR threshold and/or an RSRP threshold). The SSB measurement threshold can be pre-stored in a memory of the UE and can be defined, for instance, in a technical specification with which the UE is compatible and compliant. If the measurement metric is smaller than the threshold, the UE can determine that this SSB beam should be filtered out for the purpose of SI acquisition. Accordingly, operation 910 follows operation 906 (as indicated with a "N" above the arrow). If the measurement metric is larger than the threshold, the UE can determine that this SSB beam can be added to a set of SSB beams usable for SI acquisition. Accordingly, operation 920 follows operation 906 (as indicated with a "Y" above the arrow).

The operation flow/algorithmic structure 900 may include, at 910, ignoring PDCCH MO monitoring and/or PDSCH SI decoding. For example, even if the SSB beam is detected, the UE does not perform PDCCH decoding on the SSB beam and, thus, does not determine an MO. Alternatively, the UE may determine the MO that schedules PDSCH carrying an SI instance, but the UE does not perform a PDSCH decoding to decode the SI instance.

The operation flow/algorithmic structure 900 may include, at 920, adding the SSB beam to the set of SSB beams for SI acquisition. Here, because the SSB beam's measurement metric is larger than the threshold, the SSB beam is added to the set of SSB beams usable for the SI acquisition. In an example, adding the SSB beam includes listing the index of the SSB beam in the set.

The operation flow/algorithmic structure 900 may include, at 922, scheduling, for each beam of set of beams, PDCCH MO monitoring and/or PDSCH SI decoding. In an example, the scheduling is independent of the measurement metrics. To illustrate and referring back to FIG. 7, assume that SSB 2 beam has a higher SNR than SSB 1 beam. The MOs on SSB 2 beam are received after the MOs on SSB 1 beam and schedule an SI instance later than a corresponding one on SSB 1 beam. Despite SSB 2 beam having the higher SNR, the UE is configured to perform PDCCH MO monitoring on SSB1 beam before the PDCCH monitoring on SSB 2 beam and, given the scheduled SI instances, PDSCH SI decoding on SSB 1 beam before PDSCH SI decoding on SSB 2 beam. In another example, the scheduling depends on the measurement metrics. In particular, the UE is configured to first use an SSB beam having a higher SNR than another SSB beam and only if the SI acquisition is not successful to then use the other SSB beam. To illustrate and referring back to FIG. 7, assume that SSB 2 beam has a higher SNR than SSB 1 beam. The UE is configured to perform PDCCH MO monitoring on SSB2 beam to then perform PDSCH SI decoding on SSB 2 beam. Only if this PDSCH SI decoding fails, the UE is configured to perform PDCCH monitoring on SSB 1 beam (e.g., at the next available opportunity, such as slots "6" and "7" per the illustration of FIG. 7) to then decode the scheduled SI instance on SSB 1 beam. As such, these two examples correspond to two PDSCH SI decoding implementations once the SSB beams have been selected. In particular, the former example corresponds to a time-based implementation, where the SI instances are decoded depending on their scheduled receptions. Referring back to the selection of SSB 1 beam and SSB 2 beam and the scheduling of SI instances on these beams, the implementation starts with decoding PDSCH SI on SSB 1 beam. If that fails, PDSCH SI decoding on SSB 2 beam is performed. If that fails, PDSCH SI decoding on SSB 1 beam is performed again, and so on. The latter example corresponds to a measurement-based implementation, where the initial decoding of an SI instances depends on the best measured SSB beam. Referring back to the selection of SSB 1 beam and SSB 2 beam and to SSB 2 beam having the better SNR, this implementation skips the first PDSCH SI decoding on SSB 1 beam. Instead, the implementation starts with the PDSCH SI decoding on SSB 2 beam. Only if that fails, PDSCH SI decoding on SSB 1 beam is performed next, and so on.

The operation flow/algorithmic structure 900 may include, at 924, performing PDSCH SI decoding on an SSB beam of the set of SSB beams and determining whether the PDSCH SI decoding is successful. As explained herein above, the PSDCH SI decoding can be independent of or depend on the measurement metric of the SSB beam. In both cases, the UE performs blind decoding of a search space of a PDCCH on SSB beam. If this decoding (e.g., decoded DCI) indicates that an SI instance is scheduled, the UE can schedule the decoding of resources of a PDSCH on the SSB beam, where these resources are determined based on the DCI-indicated schedule. These resources are then decoded to determine content of the SI instance. This content includes a CRC. The decoded CRC is checked to determine whether a decoding success or a decoding failure occurred. The decoding success corresponds to a CRC pass. If the decoding failure is determined, operation 930 follows operation 924 (as indicated with a "N" above the arrow). Otherwise, operation 940 follows operation 924 (as indicated with a "Y" above the arrow).

The operation flow/algorithmic structure 900 may include, at 930, performing LLR combining for the next PDSCH SI decoding. For example, the PDSCH SI decoding uses quasi-cyclic low-density parity-check (QC-LDPC) decoding. The QC-LDPC decoding is performed per SI on an SSB beam. LLR information is used in this decoding. Further, this LLR information is used as the soft decoding information to start the next QC-LDPC decoding of the SI on the next SSB beam (e.g., the LLR information of the next QC-LDPC decoding is initialized to the LLR information of the previous QC-LDPC decoding). Likewise, if the next decoding also results in a CRC failure, the LLR information available from this decoding and, optionally, from the previous decoding, can be used as the soft decoding information to start the next QC-LDPC decoding of the SI on the further next SSB beam, and so on. If the next decoding is repeated for a previously decoded SSB beam, the accumulated LLR information from the previous PDSCH SI decoding can be combined with the current LLR information.

The operation flow/algorithmic structure 900 may include, at 940, stopping PDCCH MO monitoring and/or PDSCH SI decoding on other SSB beam(s). Once the decoding is successful (e.g., a CRC pass is determined), no additional information can be gained by decoding further SI instances. The SI acquisition is complete.

Figure 10:
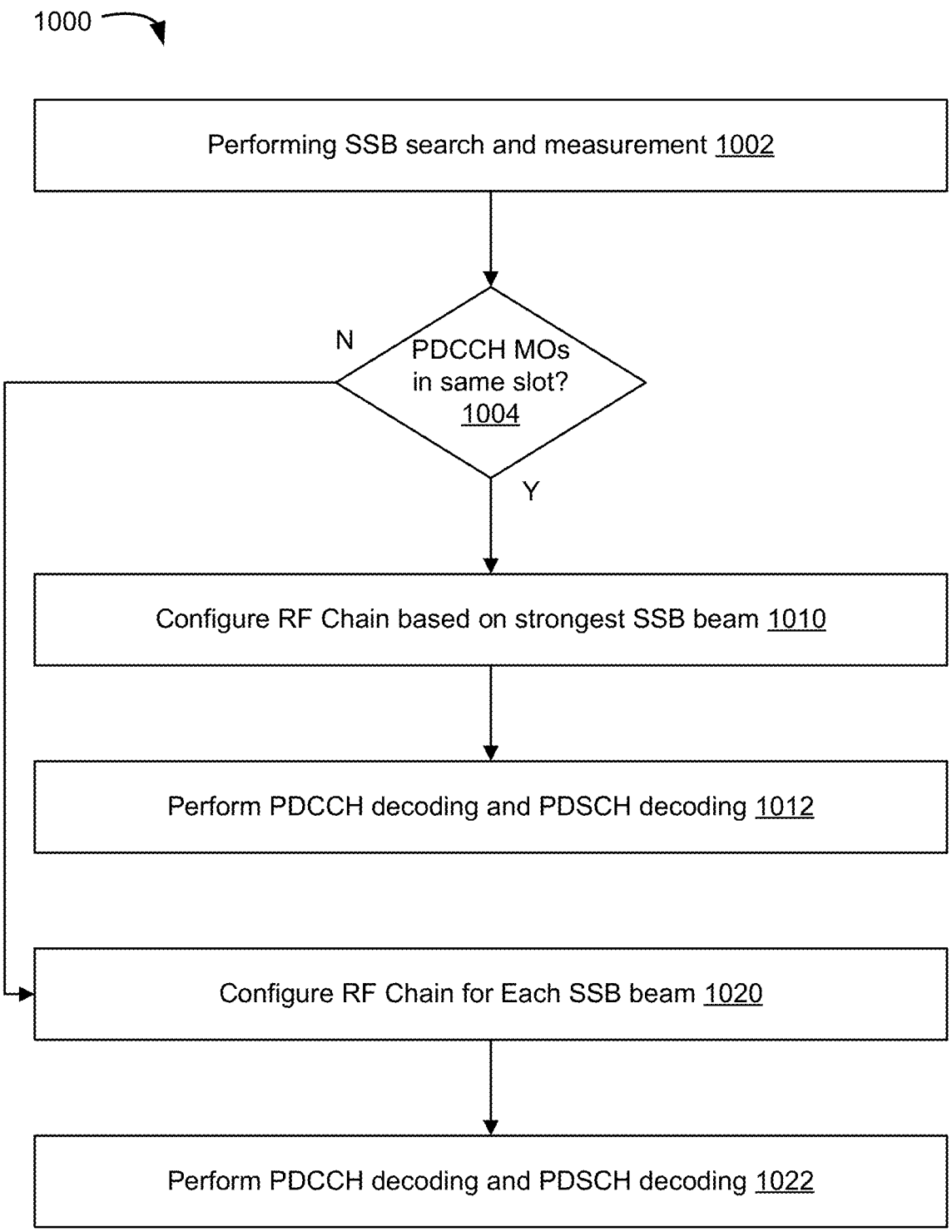
FIG. 10 illustrates an example of an operational flow/ algorithmic structure for configuring an RF chain for physical downlink control channel monitoring and physical downlink shared channel monitoring based on multiple SSB beams, in accordance with some embodiments.

FIG. 10 illustrates an example of an operational flow/algorithmic structure 1000 for configuring an RF chain for PDCCH monitoring and PDSCH monitoring based on multiple SSB beams, in accordance with some embodiments. Operations of the operational flow/algorithmic structure 1000 can be implemented as sub-operations of the operational flow/algorithmic structure 800 or 900. As explained herein above, a PDCCH monitoring occasion can be sent on each SSB beam and can indicate whether an SI instance is scheduled in a PDSCH transmission on the same beam. Depending on the timing of the PDCCH monitoring occasions on the different SSB beams, the RF chain of the UE can be configured. In particular, if multiple PDCCH monitoring occasions occur within a same slot, the RF chain can be configured according to the strongest SSB beam. In comparison, if two monitoring occasions occur in different slots, there may be enough time to re-configure the RF chains between the slots.

The operation flow/algorithmic structure 1000 may include, at 1002, performing SSB search and measurement. For example, the network (e.g., the gNB) sends SSBs periodically on each SSB beam. The UE can receive an SSB on each SSB beam and perform an SSB measurement on each received SSB.

The operation flow/algorithmic structure 1000 may include, at 1004, determining if PDCCH monitoring occasions are received in a same slot. Each PDCCH monitoring occasion can be received on a different SSB beam and can include DCI that schedules an SI instance transmission in PDSCH on the same SSB beam as the PDCCH monitoring occasion. The determination can be based on a configuration of the PDCCH monitoring occasions, where the configuration indicates whether such occasions are to be received in a same slot or different slots. The configuration can be set based on RRC signaling from a base station. If the PDCCH monitoring occasions are received in the same slot, operation 1010 follows operation 1004. Otherwise, operation 1020 follows operation 1004.

The operation flow/algorithmic structure 1000 may include, at 1010, configuring the RF chain based on the strongest SSB beam. For instance, the UE determines the strongest SSB beam based on the SSB search and measurement of operation 1002. Configuring the RF chain can include fine-tuning the RF chain by setting one or more RF parameters according to the strongest SSB beam. Such RF parameters include, for instance, the antenna gain control (AGC) of the antenna, a frequency composition of the antenna, and/or other RF parameters that may impact the reception of the RF chain.

The operation flow/algorithmic structure 1000 may include, at 1012, performing PDCCH decoding and PDSCH decoding. For instance, the different PDCCH monitoring occasions are decoded based on the RF parameter(s) that was(were) configured according to the strongest SSB beam. Based on the PDCCH monitoring occasion decoding, PDSCH is decoded to determine the SI instances per the LLR combination techniques described herein above.

The operation flow/algorithmic structure 1000 may include, at 1020, configuring RF Chain for Each SSB beam. For instance, the UE fine tunes the RF chain for each PDCCH monitoring occasion and/or PDSCH decoding on a beam based on that beam. The fine tuning can include setting the RF reception parameter(s) according to the beam. This fine tuning can be repeated for the different beams such that it is specific to each beam, rather than being set according to only the strongest beam.

The operation flow/algorithmic structure 1000 may include, at 1022, performing PDCCH decoding and PDSCH decoding. For instance, each PDCCH monitoring occasion on a beam is decoded based on the RF parameter(s) that was(were) configured according to the beam. Based on the PDCCH monitoring occasion decoding, PDSCH is decoded on that beam is also decoded, and different PDSCH decoding can be combined to determine the SI instance per the LLR combination techniques described herein above.

To illustrate the use of the operation flow/algorithmic structure 1000, consider an example of a first beam and a second beam. In this example, beam measurements are performed on the first beam and the second beam. In also this example the beam measurements indicate that the first beam is stronger than the second beam. A first PDCCH monitoring occasion over the first beam is received in a slot. The first PDCCH monitoring occasion schedules a transmission of the first SI instance over the first beam. A second PDCCH monitoring occasion over the second beam is also received in the slot. The second PDCCH monitoring occasion schedules a transmission of the second SI instance over the second beam. Accordingly in this example, the first PDCCH monitoring occasion and the second PDCCH monitoring occasion are received based on a same RF parameter of an RF chain of the UE. The RF parameter is set according the first beam based on the first beam being stronger than the second beam.

Figure 11:
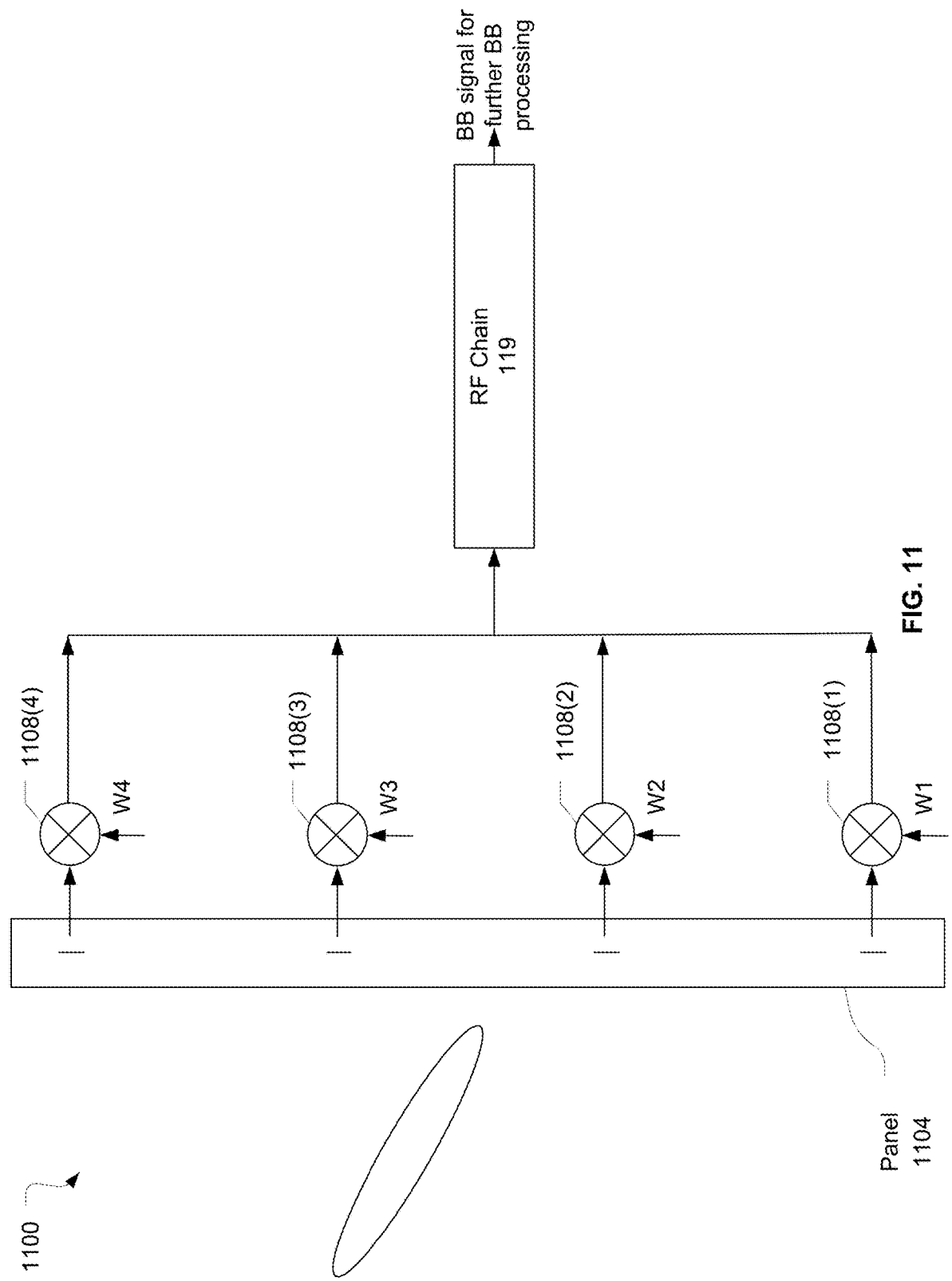
FIG. 11 illustrates an example of receive components, in accordance with some embodiments.

FIG. 11 illustrates receive components 1100 of the UE 104, in accordance with some embodiments. The receive components 1100 may include an antenna panel 1104 that includes a number of antenna elements. The panel 1104 is shown with four antenna elements, but other embodiments may include other numbers.

The antenna panel 1104 may be coupled to analog beamforming (BF) components that include a number of phase shifters 1108(1)-1108(4). The phase shifters 1108(1)-1108(4) may be coupled with a radio-frequency (RF) chain 1112. The RF chain 1112 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 1108(1)-1108(4) to provide a receive beam at the antenna panel 1104. These BF weights may be determined based on the channel-based beamforming.

Figure 12:
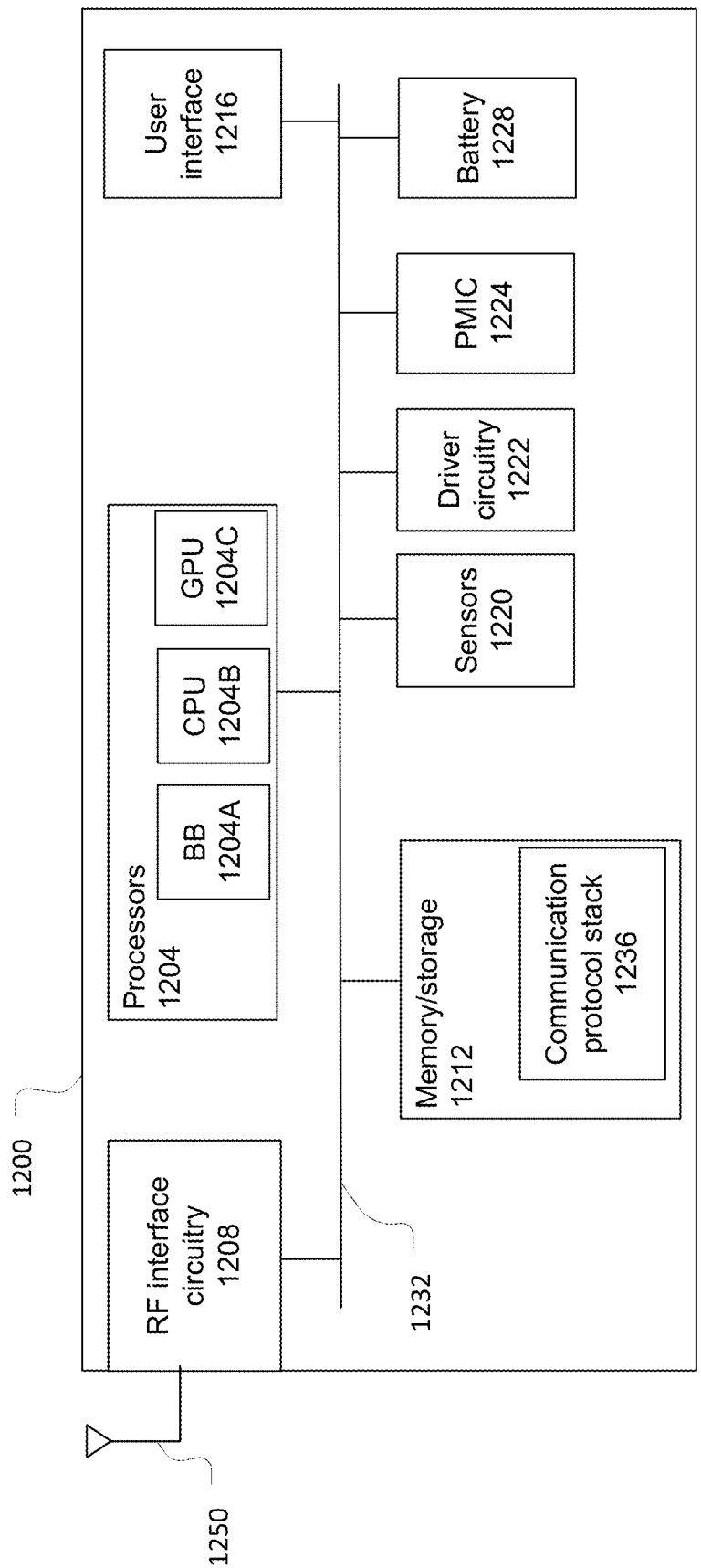
FIG. 12 illustrates an example of a UE, in accordance with some embodiments.

FIG. 12 illustrates a UE 1200, in accordance with some embodiments. The UE 1200 may be similar to and substantially interchangeable with UE 104 of FIG. 1.

Similar to that described above with respect to UE 104, the UE 1200 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras and video cameras), wearable devices, or relaxed-IoT devices. In some embodiments, the UE may be a reduced capacity UE or NR-Light UE.

The UE 1200 may include processors 1204, RF interface circuitry 1208, memory/storage 1212, user interface 1216, sensors 1220, driver circuitry 1222, power management integrated circuit (PMIC) 1224, and battery 1228. The components of the UE 1200 may be implemented as integrated circuits (ICs), portions thereof, discrete electronic devices, or other modules, such as logic, hardware, software, firmware, or a combination thereof. The block diagram of FIG. 12 is intended to show a high-level view of some of the components of the UE 1200. However, some of the components shown may be omitted, additional components may be present, and different arrangements of the components shown may occur in other implementations.

The components of the UE 1200 may be coupled with various other components over one or more interconnects 1232 which may represent any type of interface, input/output, bus (local, system, or expansion), transmission line, trace, optical connection, etc. that allows various circuit components (on common or different chips or chipsets) to interact with one another.

The processors 1204 may include processor circuitry, such as baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 1204A may also access group information 1224 from memory/storage 1212 to determine search space groups in which a number of repetitions of a PDCCH may be transmitted.

The memory/storage 1212 may include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1208 may include transceiver circuitry and a radio frequency front module (RFEM) that allows the UE 1200 to communicate with other devices over a radio access network. The RF interface circuitry 1208 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1250 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1250.

In various embodiments, the RF interface circuitry 1208 may be configured to transmit/receive signals in a manner compatible with NR access technologies.

The antenna 1250 may include a number of antenna elements that each convert electrical signals into radio waves to travel through the air and to convert received radio waves into electrical signals. The antenna elements may be arranged into one or more antenna panels. The antenna 1250 may have antenna panels that are omnidirectional, directional, or a combination thereof to enable beamforming and multiple input, multiple output communications. The antenna 1250 may include micro-strip antennas, printed antennas that are fabricated on the surface of one or more printed circuit boards, patch antennas, phased array antennas, etc. The antenna 1250 may have one or more panels designed for specific frequency bands including bands in FR1 or FR2.

The user interface circuitry 1216 includes various input/output (I/O) devices designed to enable user interaction with the UE 1200. The user interface 1216 includes input .device circuitry and output device circuitry Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs)) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example, cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within or connected to the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, or audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time and thus, save power. If there is no data traffic activity for an extended period of time, then the UE 1200 may transition off to an RRC Idle state, where it disconnects from the network and does not perform operations, such as channel quality feedback, handover, etc. The UE 1200 goes into a very low power state, and it performs paging where again it periodically wakes up to listen to the network and then powers down again. The UE 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 1228 may power the UE 1200, although in some examples the UE 1200 may be mounted deployed in a fixed location and may have a power supply coupled to an electrical grid. The battery 1228 may be a lithium-ion battery, a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
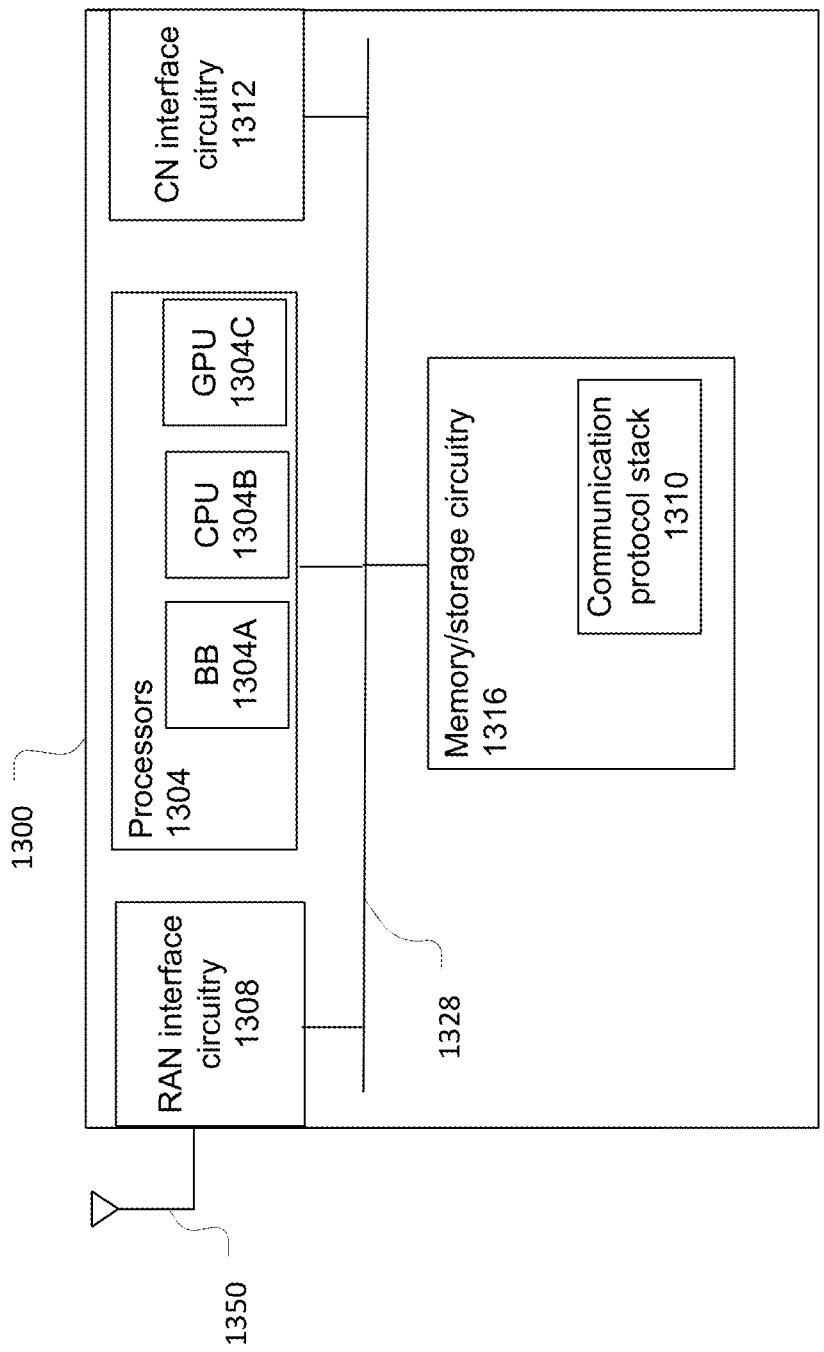
FIG. 13 illustrates an example of a base station, in accordance with some embodiments.

FIG. 13 illustrates a gNB 1300, in accordance with some embodiments. The gNB node 1300 may be similar to and substantially interchangeable with gNB 108.

The gNB 1300 may include processors 1304, RF interface circuitry 1308, core network (CN) interface circuitry 1312, and memory/storage circuitry 1316.

The components of the gNB 1300 may be coupled with various other components over one or more interconnects 1328.

The processors 1304, RF interface circuitry 1308, memory/storage circuitry 1316 (including communication protocol stack 1310), antenna 1350, and interconnects 1328 may be similar to like-named elements shown and described with respect to FIG. 11.

The CN interface circuitry 1312 may provide connectivity to a core network, for example, a $5^{th}$ Generation Core network (5GC) using a 5GC-compatible network interface protocol, such as carrier Ethernet protocols or some other suitable protocol. Network connectivity may be provided to/from the gNB 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate, in accordance with one or more of the examples set forth below. For another example, circuitry associated with a UE, base station, network element, etc., as described above in connection with one or more of the preceding figures, may be configured to operate in accordance with one or more of the examples set forth below in the example section.

Examples

In the following sections, further exemplary embodiments are provided.

Example 1 includes a method implemented by a user equipment (UE), the method comprising: receiving, from a network during a system information (SI) window, a plurality of SI instances of system information, wherein the SI window is a time duration during which the network transmits the plurality of SI instances, and wherein at least one SI instance is transmitted per beam of a plurality of beams; decoding a first SI instance of the plurality of SI instances, the first SI instance received over a first beam of the plurality of beams; decoding a second SI instance of the plurality of SI instances, the second SI instance received over a second beam of the plurality of beams; and acquiring the system information based on the decoding of the first SI instance and the decoding of the second SI instance.

Example 2 includes a method of example 1, further comprising: selecting a set of beams of the plurality of beams based on measurement metrics that respectively correspond to the plurality of beams, wherein the set of beams includes the first beam and the second beam, and wherein the first SI instance is decoded based on the first beam being included in the set of beams.

Example 3 includes a method of example 2, wherein the measurement metrics include at least one of reference signal received power (RSRP) measurements or signal to noise ratio (SNR) measurements, and wherein the method further comprises: comparing at least one of an RSRP measurement or an SNR measurement of the first beam with a measurement metric threshold; and including the first beam in the set of beams based on the comparison.

Example 4 includes a method of any preceding example, wherein the first SI instance is received in a first set of resources of a first physical downlink shared channel (PDSCH), wherein the second SI instance is received in a second set of resources of a second PDSCH.

Example 5 includes a method of example 4, wherein the first SI instance is decoded by performing a first soft PDSCH decoding based on first log-likelihood ratio (LLR) information associated with the first PDSCH, wherein the second SI instance is decoded by performing a second soft PDSCH decoding based on a combination of the first LLR information and second LLR information that is associated with the second PDSCH.

Example 6 includes a method of example 5, further comprising: determining a failure of the first soft PDSCH decoding, wherein the second soft PDSCH decoding is performed based on the failure.

Example 7 includes a method of example 6, wherein the failure includes a cyclic redundancy check (CRC) failure.

Example 8 includes a method of example 5, further comprising: determining a first failure of the first soft PDSCH decoding, wherein the second soft PDSCH decoding is performed based on the first failure; determining a second failure of the second soft PDSCH decoding; and decoding, based on the second failure, a third SI instance of the plurality of SI instances, the third SI instance received over the first beam, wherein the system information is acquired further based on the decoding of the third SI instance.

Example 9 includes a method of example 8, wherein the third SI instance is received in a third set of resources of a third PDSCH, and wherein the third SI instance is decoded by performing a third soft PDSCH decoding based on a combination of the first LLR information, the second LLR information, and third LLR information associated with the third PDSCH.

Example 10 includes a method of example 8, wherein the third SI instance is received in a third set of resources of a third PDSCH, wherein the third SI instance is decoded by performing a third soft PDSCH decoding based on a combination of the second LLR information and third LLR information associated with the third PDSCH, wherein the combination excludes the first LLR information.

Example 11 includes a method of any preceding example, further comprising: selecting a set of beams of the plurality of beams based on measurement metrics that respectively correspond to the plurality of beams, wherein the set of beams includes the first beam and the second beam; scheduling the decoding of the first SI instance based on a first monitoring occasion associated with the first SI instance; and performing a soft decoding of the first SI instance based on the scheduling and independent of a scheduling of the decoding of the second SI instance and of the measurement metrics.

Example 12 includes a UE comprising means to perform one or more elements of a method described in or related to any of the examples 1-11.

Example 13 includes one or more non-transitory computer-readable media comprising instructions to cause a UE, upon execution of the instructions by one or more processors of the UE, to perform one or more elements of a method described in or related to any of the examples 1-11.

Example 14 includes a UE comprising logic, modules, or circuitry to perform one or more elements of a method described in or related to any of the examples 1-11.

Example 15 includes a UE comprising: one or more processors and one or more computer-readable media comprising instructions that, when executed by the one or more processors, cause the one or more processors to perform one or more elements of a method described in or related to any of the examples 1-11.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:
1. An apparatus comprising:
 processor circuitry configured to:
  determine, for a plurality of system information (SI) instances scheduled for reception over respective beams, an order of decoding attempts based on channel quality measurements of the respective beams, the order indicating that decoding of a later-scheduled SI instance on a first beam with a higher channel quality than that of a second beam is attempted before decoding an earlier-scheduled SI instance on the second beam;

decode, based on the order and by using a first decoding procedure, a first SI instance of the plurality of SI instances, the first SI instance received over the first beam;

decode, after a failure of the first decoding procedure and by using a second decoding procedure, a second SI instance of the plurality of SI instances, the second SI instance received over the second beam; and acquire the system information based on the second SI instance; and interface circuitry coupled with the processing circuitry to enable communication.

2. The apparatus of claim 1, wherein the processing circuitry is further configured to:

select a set of beams of the respective beams based on measurement metrics that respectively correspond to the respective beams, wherein the set of beams includes the first beam and the second beam, and wherein the first SI instance is decoded based on the first beam being included in the set of beams.

3. The apparatus of claim 2, wherein the measurement metrics include at least one of reference signal received power (RSRP) measurements or signal to noise ratio (SNR) measurements, wherein the processing circuitry is further configured to:

compare at least one of an RSRP measurement or an SNR measurement of the first beam with a measurement metric threshold; and include the first beam in the set of beams based on the comparison.

4. The apparatus of claim 1, wherein the first SI instance is received in a first set of resources of a first physical downlink shared channel (PDSCH), wherein the second SI instance is received in a second set of resources of a second PDSCH.

5. The apparatus of claim 4, wherein the first SI instance is unsuccessfully decoded based on log likelihood ratio (LLR) information.

6. The apparatus of claim 5, wherein the processing circuitry is further configured to:

determine the failure of the first decoding procedure.

7. The apparatus of claim 6, wherein the failure includes a cyclic redundancy check (CRC) failure.

8. The apparatus of claim 5, wherein the processing circuitry is further configured to:

determine a second failure of the second decoding procedure; and decode, based on the second failure, a third SI instance of the plurality of SI instances, the third SI instance received over the first beam, wherein the system information is acquired further based on the third SI instance.

9. The apparatus of claim 8, wherein the third SI instance is received in a third set of resources of a third PDSCH.

10. The apparatus of claim 8, wherein the third SI instance is received in a third set of resources of a third PDSCH, wherein the third SI instance is decoded by performing a third decoding based on second LLR information of the second decoding procedure and independently of the LLR information of the first decoding procedure.

11. The apparatus of claim 1, wherein the processing circuitry is further configured to:

select a set of beams of the respective beams based on measurement metrics that respectively correspond to the respective beams, wherein the set of beams includes the first beam and the second beam; and schedule the decoding of the first SI instance based on a first monitoring occasion associated with the first SI instance.

12. A method implemented comprising:

determining, for a plurality of system information (SI) instances scheduled for reception over respective beams, an order of decoding attempts based on channel quality measurements of the respective beams, the order indicating that decoding of a later-scheduled SI instance on a first beam with a higher channel quality than that of a second beam is attempted before decoding an earlier-scheduled SI instance on the second beam;

decoding, based on the order and by using a first decoding procedure, a first SI instance of the plurality of SI instances, the first SI instance received over the first beam;

decoding, after a failure of the first decoding procedure and by using a second decoding procedure, a second SI instance of the plurality of SI instances, the second SI instance received over the second beam; and acquiring the system information based on the second SI instance.

13. The method of claim 12, further comprising:

selecting a set of beams of the respective beams based on measurement metrics that respectively correspond to the respective beams, wherein the set of beams includes the first beam and the second beam, and wherein the first SI instance is decoded based on the first beam being included in the set of beams.

14. The method of claim 12, wherein the first SI instance is received in a first set of resources of a first physical downlink shared channel (PDSCH), wherein the second SI instance is received in a second set of resources of a second PDSCH.

15. The method of claim 14, wherein the first SI instance is unsuccessfully decoded by performing the first decoding procedure based on log likelihood ratio (LLR) information.

16. The method of claim 15, further comprising:

determining the failure of the first decoding procedure.

17. The method of claim 15, further comprising:

determining a second failure of the second decoding procedure; and decoding, based on the second failure, a third SI instance of the plurality of SI instances, the third SI instance received over the first beam, wherein the system information is acquired further based on the third SI instance.

18. One or more non-transitory computer-readable storage media storing instructions that, upon execution, cause operations comprising:

determining, for a plurality of system information (SI) instances scheduled for reception over respective beams, an order of decoding attempts based on channel quality measurements of the respective beams, the order indicating that decoding of a later-scheduled SI instance on a first beam with a higher channel quality than that of a second beam is attempted before decoding an earlier-scheduled SI instance on the second beam;

decoding, based on the order and by using a first decoding procedure, a first SI instance of the plurality of SI instances, the first SI instance received over the first beam;

decoding, after a failure of the first decoding procedure and by using a second decoding procedure, a second SI instance of the plurality of SI instances, the second SI instance received over the second beam; and acquiring the system information based on the second SI instance.

19. The one or more non-transitory computer-readable storage media of claim 18, wherein the first SI instance is received in a first set of resources of a first physical downlink shared channel (PDSCH), wherein the second SI instance is received in a second set of resources of a second PDSCH.

20. The one or more non-transitory computer-readable storage media of claim 18, wherein the operations further comprise:

performing beam measurements on the first beam and the second beam, wherein the beam measurements indicate that the first beam is stronger than the second beam;

receiving, in a slot, a first physical downlink control channel (PDCCH) monitoring occasion over the first beam, wherein the first PDCCH monitoring occasion schedules a transmission of the first SI instance over the first beam; and receiving, in the slot, a second PDCCH monitoring occasion over the second beam, wherein the second PDCCH monitoring occasion schedules a transmission of the second SI instance over the second beam, wherein the first PDCCH monitoring occasion and the second PDCCH monitoring occasion are received based on a same radio frequency (RF) parameter of an RF chain, wherein the RF parameter is set according to the first beam based on the first beam being stronger than the second beam.

* * * * *